United States Patent Office 3,539,582
Patented Nov. 10, 1970

3,539,582
IMIDAZO-[1,2-a]PYRIDINE-2,3-DICARBOXYLATES
Giorgio Ferrari, Milan, and Cesare Casagrande, Como, Italy, assignors to Siphar S.A., Lugano, Switzerland, a company of Switzerland
No Drawing. Filed Jan. 15, 1968, Ser. No. 697,573
Claims priority, application Belgium, Jan. 18, 1967, 44,432
Int. Cl. C07d 57/04
U.S. Cl. 260—295       2 Claims

ABSTRACT OF THE DISCLOSURE

There are disclosed (a) new heterocyclic derivatives of imidazo-[1,2-a]pyridine of the formula:

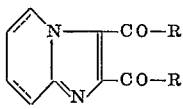

where R represents hydroxyl groups, lower alkoxyl radicals, the —$NH_2$ or —NH—$NH_2$ group or, taken together, the —NH—NH-group and where the pyridic nucleus can be saturated, and (b) a process for producing these new pharmaceutical compounds comprising condensing the esters of α-bromo or α-chloro oxalacetic acid with 2-amino-pyridine and then transforming the product obtained by hydrogenation and/or by saponification or by reaction with ammonia or hydrazine. The compounds of the present invention are useful as a result of their analeptic properties.

---

The present invention has for its object a group of new heterocyclic compounds endowed with interesting therapeutic properties.

These compounds correspond to the general formula

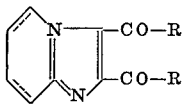

and their fundamental component is, as a consequence, the nucleus of imidazo-[1,2-a]pyridine in two different conditions of saturation. In effect, the double bond indicated by a discontinuous line can be present; and in this case, the formula represents the nucleus of imidazo-[1,2-a]pyridine; or if absent, the formula represents the nucleus of the 5,6,7,8-tetrahydro-imidazo-[1,2-a]pyridine. R can represent a hydroxyl group, or a lower alkoxyl radical, or a group —$NH_2$ or a group —$NHNH_2$. Moreover, it can represent jointly a group —NH—NH, in constituting a pyridazinic nucleus.

The following are heterocyclic compounds corresponding to this invention:

imidazo-[1,2-a]pyridine-2,3-dicarboxylic acid,
5,6,7,8-tetrahydro-imidazo-[1,2-a]pyridine-2,3-dicarboxylic acid;
ethyl imidazo-[1,2-a]pyridine-2,3-dicarboxylate;
ethyl 5,6,7,8-tetrahydro-imidazo-[1,2-a]pyridine-2,3-dicarboxylate;
imidazo-[1,2-a]pyridine-2,3-dicarboxamide;
5,6,7,8-tetrahydro-imidazo-[1,2-a]pyridine-2,3-dicarboxamide;
dihydrazide of 5,6,7,8-tetrahydro-imidazo-[1,2-a]pyridine-2,3-dicarboxylic acid; and
2,3,6,7,8,9-hexahydropyrido-[1',2'-1,2]-imidazo-[4,5-d]-pyridazine-1,4-dione, as well as their salts and complexes with organic or inorganic acids or bases suitable for pharmaceutical usage.

The present invention has also for its object a process for the preparation of these compounds by which in a first phase a diester of a halogenated oxalacetic acid is condensed with the 2-aminopyridine according to the following scheme:

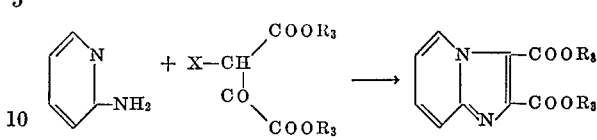

in which X represents a halogen atom and $R_3$ a lower alkyl radical, and eventually in a second phase the product obtained is transformed by submitting it to catalytic hydrogenation and/or to reaction of the esterified carboxyl group suitable for the production of the compounds mentioned above.

The cyclization phase comprises condensation of the 2-aminopyridine with ethyl α-chloro or ethyl α-bromo-oxalacetate in a suitable solvent such as dioxane, acetone, alcohol, etc. in the presence or not of an acceptor of hydrochloric acid, such as sodium hydrogen carbonate, potassium carbonate, N,N-dicyclohexylmethylamine, etc. at temperatures between ambient temperature and the boiling temperature of the solvent.

The preferred technique is the reaction between 2-aminopyridine and diethyl chlorooxalacetate in boiling dioxane in the presence of sodium hydrogen carbonate.

The eventual phase of hydrogenation consists of a catalytic hydrogenation with metallic catalysts (platinum, palladium, nickel, etc.), pure or adequately supported, at temperatures between 0 and 100° and under pressures which vary from atmospheric pressure up to 120 atmospheres. The preferred technique is hydrogenation at ambient temperature and under a pressure between 1 and 10 atmospheres in the presence of palladium on charcoal.

Known techniques, such as saponification by alkaline hydrates or alkaline earths, reaction with concentrated or anhydrous ammonia, and reaction with hydrazine, pure or in solution, are used under suitable conditions for the saponification of the esters and the transformation of the esterified carboxyl groups into amide or hydrazide groups.

The heterocyclic compounds of the present invention are endowed with analeptic properties. They can be employed for the treatment of certain troubles of the respiratory and circulatory systems, e.g. in the therapy of arterial hypotension, neuro-circulatory asthenia, chronic bronchopathy and so on.

The present invention has also for an object pharmaceutical compounds which contain, as active constituents, the heterocyclic compounds mentioned above or their salts, alone or in combination with other active medicinal ingredients, combined with the vehicles or diluents suitable for pharmaceutical usage. Among the indicated compositions are tablets, capsules, injectable solutions, suppositories, etc.

This invention is illustrated but not limited by the following examples.

The melting points are not corrected.

EXAMPLE 1

60 g. of 2-aminopyridine with 145 g. of diethyl chloro-oxalacetate and 120 g. of sodium hydrogen carbonate in 950 mm. of dioxane are heated to boiling for three hours. The mixture is then filtered, evaporated under vacuum, the residue is washed with water and taken up in ether. By addition of anhydrous hydrogen chloride to the dried ether solution there is obtained the diethyl imidazo-[1,2-a]pyridine-2,3-dicarboxylate hydrochloride which, after crystallization from acetone, has a melting point of 125 to 127°. By treatment of the hydrochloride with diluted ammonia there is obtained the base, having a melting point between 48 and 50°.

EXAMPLE 2

A mixture of 50 g. of diethylimidazo-[1,2,a]-pyridine-2,3-dicarboxylate hydrochloride and 20 g. of 10% palladium on carbon in 350 cm.³ of alcohol is hydrogenated at ambient temperature under a pressure of 2 to 10 atmospheres. After the absorption of the calculated quantity of hydrogen is achieved, the catalyst is filtered, the mixture is evaporated under vacuum, and the residue is crysallized from acetone. Thus there is obtained the hydrochloride of the diethyl ester of 5,6,7,8-tetrahydro-imidazo-[1,2-a]-pyridine 2,3-dicarboxylic acid, having a melting point: 134 to 136°.

EXAMPLE 3

A mixture of 65 g. of diethyl-imidazo[1,2-a]-pyridine-2,3-dicarboxylate and 750 ml. of 1 N NaOH is refluxed for two hours. The mixture is then refrigerated, acidified with 750 ml. of 1 N HCl and by filtering there is recovered imidazo-[1,2-a]-pyridine-2,3-dicarboxylic acid having melting point: 209–210° (dec.).

EXAMPLE 4

Operating as in Example 3, there is saponified diethyl 5,6,7,8 - tetrahydro-imidazo - [1,2-a]-pyridine-2,3-dicarboxylate. There is thus obtained the corresponding dicarboxylic acid with a melting point: 225 to 226°.

EXAMPLE 5

A mixture of 50 g. of diethyl imidazo-[1,2-a]-pyridine-2,3-dicarboxylate and 500 ml. of 28% ammonia is stirred for three days at room temperature; the imidazo-[1,2-a]-pyridine-2,3-dicarboxamide thus is formed, is filtered and crystallized in dimethylformamide-alcohol. Melting point: 262–264°.

EXAMPLE 6

Operating as in Example 5, and employing the diethyl 5,6,7,8 - tetrahydro - imidazo-[1,2-a]-pyridine-2,3-dicarboxylate, there is obtained the corresponding diamide with melting point: 238 to 240° (dec.).

EXAMPLE 7

A mixture of 40 g. of diethyl 5,6,7,8-tetrahydro-imidazo-[1,2-a]-pyridine-2,3-dicarboxylate and 80 ml. of hydrazine hydrate in 120 ml. of alcohol is refluxed for four hours and then evaporated to dryness under vacuum. The residue is dissolved in boiling absolute ethanol, then cooled, and the precipitate is filtered off. There is thus obtained the dihydrazide of the 5,6,7,8 - tetrahydro-imidazo-[1,2-a]-pyridine-2,3-dicarboxylic acid, with melting point: 195 to 196° (dec.).

EXAMPLE 8

The dihydrazide of the 5,6,7,8 - tetrahydro-imidazo-[1,2-a]-2,3-dicarboxylic acid is heated to 210° C. for three hours. There is obtained 2,3,6,7,8,9-hexahydropyrido-[1′, 2′–1, 2]-imidazo-[4, 5-d]pyridazine-1,4-dione having a melting point: >330°.

The following examples illustrate the preparation of compositions which are suitable for the direct therapeutic administration.

EXAMPLE 9

60 g. of diethyl imidazo-[1,2-a]-pyridine-2,3-dicarboxylate hydrochloride and 30 g. of lactose in dry powdered form are blended so as to obtain a homogeneous mixture. The mixture is then distributed in 300 gelatine capsules, which therefor singularly contain about 200 mgr. of active substance.

EXAMPLE 10

15 g. of diethyl-imidazo-[1,2-a]-pyridine-2,3-dicarboxylate are dissolved in a solution of 1,665 g. of maleic acid in 100 ml. of bidistilled water and 150 ml. of propanediol. The volume is then brought to a value of 300 ml. with bidistilled water. The solution is then stirred and thereafter filtered using a sterilizing filter. The solution is finally distributed in 150 phials, which are sterilized for 30 minutes at a temperature of 100° C. Each phial so obtained contains 100 mg. of active substance. In order to test the pharmacological activity of the above referred compositions, there have been effected some experiments on animals.

The diethyl imidazo-[1,2-a]-pyridine-2,3-dicarboxylate has been administered to cats, previously narcotized with chloralose, and to rabbits narcotized with Nembutal, so as to evaluate the respiratory analeptic activity of the above said composition. In both cases the injection of doses of 1–2 mgr./kgr. e.v. has caused either the respiration restoration in the cases of apnea due to the narcotization, or the doubling of the respiratory frequency without convulsive effects.

In narcotized dogs, at a dose of 5–10 mg./kg. e.v. the diethyl imidazo-[1,2-a]-pyridine-2,3-dicarboxylate has determined a relevant stimulation of the respiration rate and a significative increase of the arterial pressure, of the cardian flow rate and of both the femoral and the renal arterial flow rates. Similar effects on the circulatory and respiratory parameters have been observed in non-narcotized dogs with chronically implanted electromagnetic flow meters.

On the contrary, the above said composition has not shown any convulsive effect and, moreover, in rats has not enhanced convulsive effect, due to the administration of pentamethylentetrazole.

In conclusion, the compositions of the present invention, and particularly the diethyl imidazo[1,2-a]-pyridine-2,3 - dicarboxylate, have shown a respiratory analeptic activity, together with a stimulating activity on the circulatory system, without any exciting effect on the central nervous system.

The toxicity of the present composition, in terms of $LD_{50}$, in several species of animals, is very low. whatever is the administrating way.

As precedingly mentioned, the compositions of the present invention can be associated with other pharmaceutically active substances, as for example epinephrine and other sympathomimetic amines, theophylline, caffeine and strychnine.

What is claimed is:

1. A member selected from the group consisting of imidazo[1,2-a]pyridines of the formula

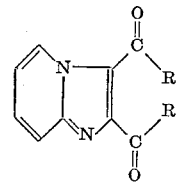

wherein R represents lower alkoxy.

2. Diethyl imidazo[1,2-a]pyridine-2,3-dicarboxylate.

References Cited

Adams et al., J. Am. Chem. Soc. 80, 4618–20 (1958).
Lombardino, J. Org. Chem. 30 (7), 2403–7 (1965).
Roe, J. Chem. Soc. 1963, 2195–200.

HENRY R. JILES, Primary Examiner
G. T. TODD, Assistant Examiner

U.S. Cl. X.R.
260—294, 294.3; 124—263

UNITED STATES PATENT OFFICE
CERTIFICATE OF CORRECTION

Patent No. 3,539,582          Dated November 10, 1970

Inventor(s) Giorgio Ferrari et al.

It is certified that error appears in the above-identified patent and that said Letters Patent are hereby corrected as shown below:

In the heading to the printed specification, line 8, "44,432" should read -- 46,432 --.

Signed and sealed this 13th day of April 1971.

(SEAL)
Attest:

EDWARD M.FLETCHER,JR.                    WILLIAM E. SCHUYLER,
Attesting Officer                        Commissioner of Pate: